United States Patent [19]

Nelson

[11] 4,262,922
[45] Apr. 21, 1981

[54] BOAT TRAILER STABILIZING DEVICE

[76] Inventor: Robert D. Nelson, Nelson Marine Products, 1653 Industrial Blvd., Lake Havasu City, Ariz. 86403

[21] Appl. No.: 99,604

[22] Filed: Dec. 3, 1979

Related U.S. Application Data

[63] Continuation of Ser. No. 892,394, Mar. 31, 1978, abandoned.

[51] Int. Cl.³ .............................................. B60P 3/10
[52] U.S. Cl. .............................................. 280/414 R
[58] Field of Search .................. 280/414 R, 414 B; 296/167; 188/321, 312; 9/1.2; 410/86, 87, 117; 248/499, 500, 503; 414/529, 536

[56] References Cited

U.S. PATENT DOCUMENTS

| 1,273,059 | 7/1918 | Hild ....................................... 188/312 |
| 3,827,717 | 8/1974 | Whitley ............................. 280/414 R |
| 4,193,610 | 3/1980 | Miller ................................ 280/414 R |

Primary Examiner—Randolph A. Reese
Assistant Examiner—Randall A. Schrecengost
Attorney, Agent, or Firm—Gregory J. Nelson

[57] ABSTRACT

A stabilizing device for a boat trailer having a floater bar. A hydraulic shock absorber is secured between the bow eye of the boat and the trailer with the shock absorber having a clevis arrangement at at least one end. The overall length of the shock absorber unit can be adjusted to meet various installation requirements.

1 Claim, 5 Drawing Figures

U.S. Patent  Apr. 21, 1981  4,262,922
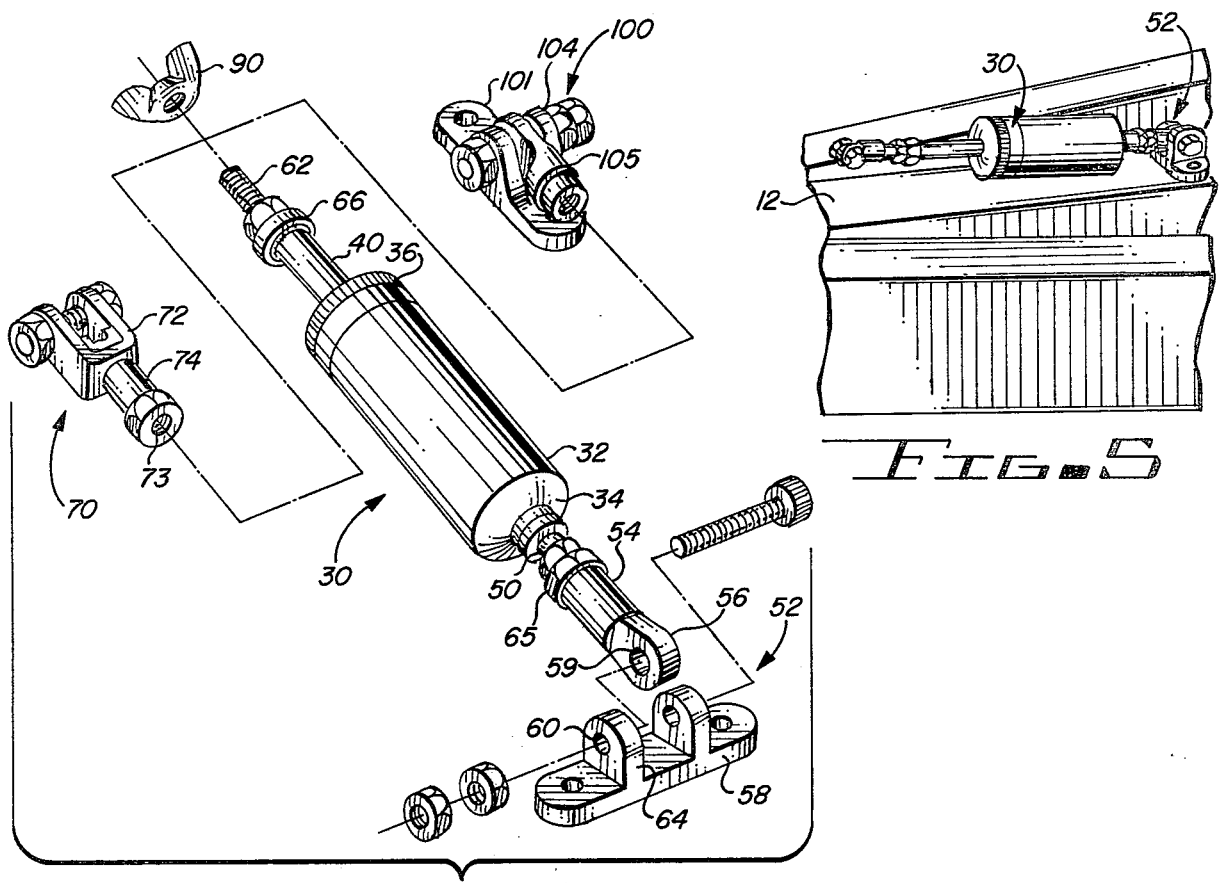
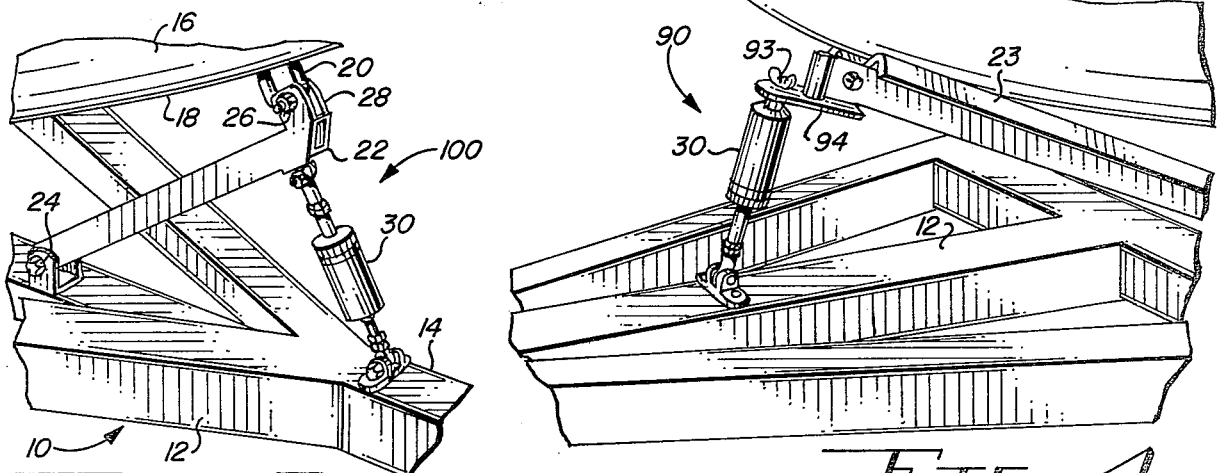
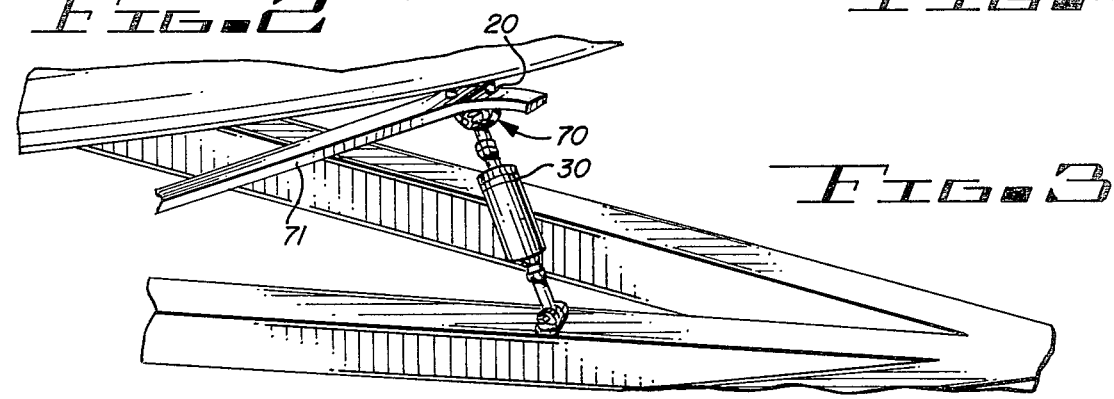

BOAT TRAILER STABILIZING DEVICE

This is a continuation, of application Ser. No. 892,394, filed Mar. 31, 1978 and now abandoned.

The present invention relates to a boat trailer cushioning device and more particularly relates to a shock absorbing assembly for dampening the bouncing tendency of a boat while transported on a trailer.

Recreational, ski, fishing and competition boats are normally transported by towing on a trailer. The trailer is constructed having an appropriate frame such as steel channels mounted on a suspension including ground engaging wheels. The hull of the boat fits into a cradle formed on the frame which conforms to the configuration of the hull. The cradle generally incorporates rubber pads to prevent damage to the boat hull. Low profile boats such as ski boats or racing boats are usually provided with a bow eye located on the underside of the forward part of one hull. The bow eye is generally attachable to a floater bar which is pivotally connected at one end to the trailer frame. The bow eye is secured to the opposite end of the floater bar to prevent the boat from lifting from the trailer when in tow.

The floater bar, since it is pivotally attached to the trailer, permits some movement of the boat when in tow. This movement or "nose bounce" can be a troublesome problem. One result of nose bounce is that the movement of the boat relative to the frame can cause damage to the hull of the boat. Even if the trailer is provided with shock absorbing pads, the pads become filled with dirt and grit and continual rubbing acts in an abrasive manner to damage the gel coat on the boat.

In addition to creating problems which damage or impair the hull, the movement or bounce normally encountered with conventional floater bar assemblies can create a safety hazard. Continual bouncing of the boat can make it difficult, and in some cases even dangerous, to tow the trailer, as the trailer is unstable.

Briefly, the present invention comprehends a shock absorbing assembly or unit for stabilizing the bow or nose of boats while in tow on a trailer. The present invention includes a floater bar having one end pivotally secured to the frame. The opposite end of the bar is attachable to the bow on the boat. A fluid dampening device such as a hydraulic shock absorber is secured between the frame and the floater bar or the bow eye. The head and rod end of the shock absorber are in threaded engagement with mounting assemblies such as clevis assemblies to extend the effective length of the cylinder rod to permit adjustment and mounting of the unit. In operation, the shock absorber serves to dampen movement of the boat in tow to minimize wear to the boat hull and stabilize the trailer tongue improving the towing characteristics of the boat and trailer.

A more complete understanding of the present invention will become apparent from the following description, claims and drawings in which:

FIG. 1 is a perspective view of the shock absorbing unit showing various mounting assemblies which may be utilized.

FIG. 2 is a perspective view illustrating the shock absorbing unit mounted on a boat trailer having a square tube-type floater bar;

FIG. 3 is a perspective view illustrating the shock absorbing unit mounted on a boat trailer having the flat-type floater bar; and FIG. 4 is a perspective view illustrating the shock absorbing unit mounted on a trailer having a V-type floater bar;

FIG. 5 is a perspective view illustrating the shock absorbing unit in an out-of-the-way position.

Referring now to the drawings, particularly FIGS. 2-4, a boat trailer is generally designated by the numeral 10, including a frame assembly 12 converging at the front to a tongue 14 which is securable to a towing vehicle such as a car or truck at a conventional ball hitch, not shown. A boat 16 is supported on a trailer. The details of the trailer and boat are not described as these are conventional and may vary with the style of trailer and boat. The particular style of boat 16 shown for purposes of representation is a competition, low profile boat, having a bow section 18 to which is attached a bow eye 20. Referring to FIG. 2, which is representative, a floater bar 22 having a generally rectangular cross section is pivotally mounted to trailer 12 at connection 24. The opposite end of bar 22 is secured to the bow eye 20 by bolts 26 extending transversely through mounting flanges 28 on the upper surface of floater bar 22. Shock absorbing unit 30 is operatively connected between the floater bar and the rear portion of trailer tongue 14. Shock absorbing unit 30 is shown in more detail in FIG. 1.

Referring to FIG. 1, shock absorbing unit 30 includes a generally cylindrical housing 32. One end of cylindrical housing 32 is closed by a head 34. The opposite end of cylindrical housing 32 is closed by a cap 36 which is welded to the housing. Head 34 may be integrally formed as part of the housing. A concentric bore, not shown, is provided in end cap 36 and sealingly receives reciprocating rod 40. The inner end of rod 40 is connected to hydraulic piston having appropriate annular seals in engagement with the interior of the housing 32 and defining opposite chambers. As is conventional in the construction of shock absorbing devices, a noncompressible hydraulic fluid tends to oppose and dampen loads. For example, as loads are applied and the rod forced inwardly, the fluid is caused to flow from the lower chamber to the upper chamber across a check valve in the piston. Springs may also be positioned in the cylinder chamber to prevent "bottoming-out." The particular details of construction of the interior cylinder construction are well known and need not to be described in detail.

An axially extending threaded rod 50 is secured by welding to the head 34 of the shock absorber. A clevis assembly 52 is secured to threaded rod 50. Clevis assembly 52 includes an eye member 56 having a cylindrical body portion 54 defining internal threads which matingly engage the external threads of the rod 50. Adjustment is accomplished by turning eye 56 relative to shaft 50 until the desired adjustment is accomplished and then locking in place by lock nut 66 which is also in threaded engagement on shaft 50.

Mounting plate 58 supports two projecting flange members 64 each defining a bore 60 which aligns with the bore 59 in eye 56. A pin or bolt 62 extends through the bores 60 in flanges 64 and bore 59 in eye 56. Washers and anti-friction devices may be inserted between the flanges and eye.

The outer end of rod 40 is threaded at section 62 at collar 66. FIG. 1 shows three types of mounting configurations that may be used with the shock absorbing assembly of the present assembly. Mounting assembly 70 includes a yoke 72 having a cylindrical section 74 defining internal threads which can be engaged with threaded section 62 of the rod. Yoke assembly 72 may be directly pinned to the bow eye 20 as shown in FIG. 3. A rubber pad 75 is inserted in the yoke and engages the bow eye when the unit is installed. The opposite end is secured to the trailer frame at mounting plate 58 by screws or bolts. Adjustment is accomplished by turning cylindrical body 74 relative to rod 40 to vary the effective length of the overall rod assembly. For further adjustment, yoke assembly 72 can be provided having a varying length of body section 74. FIG. 3 illustrates the shock absorber 30 installed at the bow eye 20 with a flat type floater bar 71.

For mounting the shock absorber 30 on trailers having a V-type floater as shown in FIG. 4, the wing nut 90 is generally used. The threaded section 62 of the rod is inserted through a bore 93 in mounting plate 94 secured to the forward end of the V-type floater bar 23. The lower end of the unit is bolted or screwed to the trailer frame member 12 at mounting plate 58. Wing nut 90 is tightened in place against plate 94 to complete the installation.

Clevis assembly 100 is generally used to secure the rod to the underside of a square type floater bar 22 as shown in FIG. 2. Clevis assembly includes a mounting plate 101 which may be secured by bolts or screws to the floater bar. The mounting plate 101 includes flange members 104 which pivotally support member 105. Member 105 has a body section 106 which defines internal threads which cooperate with threads 62 on the outer ends of rod 40. The lower end of one shock absorber is secured to the trailer frame at an appropriate location. As shown, the unit is normally mounted so the axis of the unit defines an acute angle with respect to the trailer frame.

Once the unit is installed as shown in FIGS. 2–4, movement of the boat relative to the trailer is dampened or buffered by shock absorbing unit 30. Harm to the bottom or hull of the boat is minimized as the abrasive effect of the support pads is reduced. Further, when the boat is in tow, the trailer tongue is stabilized for greater towing safety. When the boat is launched or removed from the trailer, it is a simple matter to disconnect the shock absorbing unit from the floater bar. This can be done by removing the appropriate fastener 70, 90 or 100. The only operation necessary is the removal of a wing nut, pivot pin or bolt. When not in use, the shock absorbing unit can be swung to an out-of-the-way position as shown in FIG. 5.

From the foregoing, it will be seen that the shock absorber unit of the present invention effectively reduces damage to boats while in transit and makes the boat trailer easier to tow since the front of the trailer is stabilized. The shock absorber of the present invention can be provided as part of the trailer or it can be provided in kit form to be easily retrofitted in existing trailers. The adjustable length of the unit facilitates easy mounting to varying trailer configurations.

The present invention can be fabricated from conventional materials and may be chrome plated for appearance and to minimize rust and deterioration due to exposure to the elements.

It will be obvious to those skilled in the art to make various changes, alterations and modifications to the embodiments herein described. To the extent that these changes, alterations and modifications do not depart from the spirit and scope of the appended claims, they are intended to be encompassed therein.

I claim:

1. A stabilizing device for a boat trailer having a frame for supporting a boat of the type having a hull with a bow eye secured to the forward underside portion of the hull and a floater bar having one end pivotally secured to the trailer and the other end securable at said bow eye, said device comprising:
   (a) a double acting hydraulic shock absorber having a head end and a rod end with an actuating rod extending from said rod end and a mounting rod extending axially from said head end, said mounting rod being axially threaded;
   (b) first attachment means on one of said rods for detachably securing said stabilizing device to one of said bow eye or said floater bar;
   (c) second attachment means on the other of said rods for securing said stabilizing device to the trailer, said second attachment means including a clevis flange and a clevis eye internally threaded and cooperative with said mounting threaded rod and axially moveable along said mounting rod by rotating said clevis eye relative thereto, thereby effectively adjusting the overall length of said stabilizing device and permitting said device to be pivoted to a substantially horizontal out-of-the-way position when said first attachment means is detached; and
   (d) locking nut means in threaded engagement with said mounting rod and adjustable therealong and engageable with said clevis eye to lock said clevis eye at a preselected position whereby said stabilizing device is securable between the said boat and trailer to hydraulically dampen nose bounce in both pivotal directions of said floater bar and to stabilize the boat when the trailer is in tow.

* * * * *